(12) United States Patent
Jeon et al.

(10) Patent No.: US 8,735,459 B2
(45) Date of Patent: May 27, 2014

(54) COMPOSITION FOR PREPARING EXPANDABLE POLYPROPYLENE CARBONATE AND EXPANDABLE POLYPROPYLENE CARBONATE PREPARED THEREFROM

(75) Inventors: Minho Jeon, Daejeon (KR); Younghyo Park, Seoul (KR); Kwangjin Chung, Daejeon (KR); Myungahn Ok, Daejeon (KR)

(73) Assignee: SK Innovations Co., Ltd. (KR)

( * ) Notice: Subject to any disclaimer, the term of this patent is extended or adjusted under 35 U.S.C. 154(b) by 332 days.

(21) Appl. No.: 13/269,716

(22) Filed: Oct. 10, 2011

(65) Prior Publication Data

US 2012/0190761 A1 Jul. 26, 2012

(30) Foreign Application Priority Data

Jan. 21, 2011 (KR) ........................ 10-2011-0006195

(51) Int. Cl.
*C08K 3/26* (2006.01)
*C08J 9/00* (2006.01)
*C08J 9/18* (2006.01)

(52) U.S. Cl.
CPC .............. *C08J 9/0061* (2013.01); *C08J 9/0066* (2013.01); *C08J 9/18* (2013.01); *C08J 2201/026* (2013.01); *C08J 2203/06* (2013.01); *C08J 2369/00* (2013.01); *C08J 2467/02* (2013.01); *C08J 2433/06* (2013.01)
USPC ............. 521/138; 521/182; 525/67; 525/133; 525/146; 525/148; 525/439

(58) Field of Classification Search
CPC .......... C08J 9/0061; C08J 9/0006; C08J 9/18; C08J 2467/02; C08J 2203/06; C08J 2369/00; C08J 2201/026; C08J 2433/06
USPC ............ 525/67, 133, 146, 148, 439; 521/138, 521/182
See application file for complete search history.

(56) References Cited

U.S. PATENT DOCUMENTS

| | | | | |
|---|---|---|---|---|
| 3,971,756 | A | * | 7/1976 | Bialous et al. ................. 524/157 |
| 4,764,556 | A | * | 8/1988 | Lausberg et al. ................ 525/67 |
| 2005/0250914 | A1 | * | 11/2005 | Stumbe et al. ................. 525/437 |
| 2011/0178196 | A1 | * | 7/2011 | Steinke et al. ................. 521/135 |
| 2012/0041086 | A1 | * | 2/2012 | Sampath et al. ................. 521/59 |

FOREIGN PATENT DOCUMENTS

| | | | |
|---|---|---|---|
| KR | 1020110000440 | | 1/2011 |
| WO | WO 2010/034689 | * | 4/2010 |
| WO | 2011005664 | | 1/2011 |

* cited by examiner

*Primary Examiner* — Irina S Zemel
(74) *Attorney, Agent, or Firm* — Cantor Colburn LLP

(57) ABSTRACT

Provided are a composition for preparing expandable polypropylene carbonate and an expandable polypropylene carbonate prepared therefrom, and more particularly, to a composition for preparing expandable polypropylene carbonate capable of using supercritical carbon dioxide as a foaming agent and producing a foam having excellent moldability by using an appropriate foaming method. By using the composition according to the present invention, highly magnificated expandable polypropylene carbonate capable of having excellent thermal stability and dimensional stability can be prepared.

13 Claims, No Drawings

COMPOSITION FOR PREPARING EXPANDABLE POLYPROPYLENE CARBONATE AND EXPANDABLE POLYPROPYLENE CARBONATE PREPARED THEREFROM

CROSS-REFERENCE TO RELATED APPLICATIONS

This application claims priority under 35 U.S.C. §119 to Korean Patent Application No. 10-2011-0006195, filed on Jan. 21, 2011, in the Korean Intellectual Property Office, the disclosure of which is incorporated herein by reference in its entirety.

TECHNICAL FIELD

The present invention relates to a composition for preparing expandable polypropylene carbonate and an expandable polypropylene carbonate prepared therefrom, and more particularly to a composition for preparing expandable polypropylene carbonate capable of using supercritical carbon dioxide as a foaming agent and producing a foam having excellent moldability by using an appropriate foaming method, and a highly magnificated expandable polypropylene carbonate capable of having excellent thermal stability and dimensional stability, prepared from the composition.

BACKGROUND

A synthetic resin foam is variously used for an adiabatic material, a packaging material, a buffer material, an interior material, and the like, due to small weight, and superior adiabatic and buffer effects thereof. There are various resins such as polystyrene, polyethylene, polypropylene, and the like, as a synthetic resin used here. However, these incur pollution problems at the time of disposing thereof, and thus, are being requested to be changed into eco-friendly products in the long term.

Polypropylene carbonate, which is a product prepared by using carbon dioxide as a raw material, is an eco-friendly product having an effect of reducing about 50% in costs of petrochemical raw material, as compared with a product produced from the petrochemical raw material, and does not cause harmful gases generated from the existing synthetic resins even at the time of incineration. However, when this eco-friendly polypropylene carbonate is alone foamed, it shrinks at room temperature after foaming, and thus, fails to retain an initial shape.

Therefore, an expandable polypropylene carbonate, which is eco-friendly, substituted for the existing synthetic resin foam, and has a shape retention performance and dimensional stability at a use temperature after foaming, is being requested in view of economical and environmental aspects.

SUMMARY

An object of the present invention is to provide a composition for producing an expandable polypropylene carbonate having excellent foaming performance and foam shape retention performance, and remarkably reducing harmful gases generated at the time of burning.

Another object of the present invention is to provide an expandable polypropylene carbonate prepared using the composition.

In one general aspect, the present invention is directed to a composition for preparing expandable polypropylene carbonate and expandable polypropylene carbonate prepared therefrom, and more particularly, to a composition for preparing expandable polypropylene carbonate capable of using supercritical carbon dioxide as a foaming agent and producing a foam having excellent moldability by using an appropriate foaming method. By using the composition according to the present invention, a highly magnificated expandable polypropylene carbonate having excellent thermal stability and dimensional stability can be prepared.

Hereinafter, the present invention will be described in more detail.

The present invention is directed to a composition for preparing an expandable polypropylene carbonate, including (A) 100 parts by weight of a base resin consisting of (a1) 10 to 90 wt % of a polypropylene carbonate resin and (a2) 10 to wt % of a thermoplastic resin; (B) 0.1 to 20 parts by weight of a polypropylene carbonate compatibilizer; (C) 0.01 to 10 parts by weight of a cross-linking agent, a chain extender, or a mixture thereof; (D) 0.1 to 10 parts by weight of an inorganic material; and (E) 0.01 to 1 parts by weight of a heat stabilizer.

Here, the present invention enhances the melting strength at a processing temperature by feeding the cross-linking agent, the chain extender, or the mixture thereof (C), and improving the compatibility of the polypropylene carbonate resin (a1) and the thermoplastic resin (a2) constituting the base resin (A) by inputting the polypropylene carbonate compatibilizer (B), thereby allowing the preparation of a highly magnificated expandable polypropylene carbonate having excellent thermal stability and dimensional stability.

The base resin (A) may be made of 10 to 90 wt % of the polypropylene carbonate resin (a1) and the 10 to 90 wt % of the thermoplastic resin (a2). The polypropylene carbonate resin (a1) is high-molecular weight polypropylene carbonate or polypropylene carbonate copolymer, and it has preferably a weight average molecular weight of 10,000 to 1,000,000. Further, the addition of thermoplastic resin (a2) can improve dimensional stability and heat resistant property of the expandable polypropylene carbonate. If a use content of the thermoplastic resin is below 10 wt %, it is difficult to anticipate dimensional stability and thermal stability of foam molded products. Specifically, one or a mixture of two or more selected from the group consisting of polyethylene terephthalate glycol (PETG), polylactic acid, polyvinylacetate, polycaprolactone, polymethylmethacrylate, ethylene-vinylacetate copolymer(EVA), ethylene methacrylate-glycidyl methacylate copolymer, polyethylene, polypropylene, and copolyester of the following structure, may be used for the thermoplastic resin:

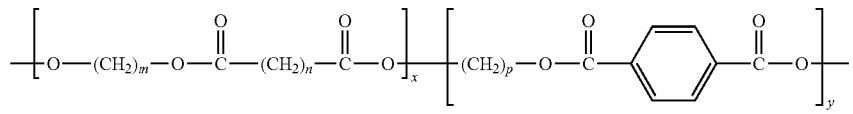

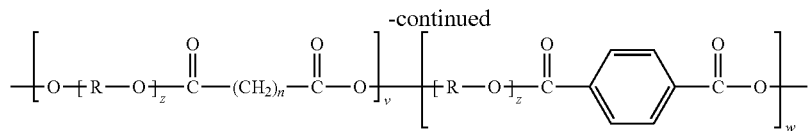

In the above structure, —[R—O]$_z$— represents polyol selected from the group consisting of (a) polyester polyol triol having a molecular weight of 200 to 10,000, (b) polyether glycol having a molecular weight of 200 to 10,000, and (c) polyester polyol diol having a molecular weight of 10,000 or less; m represents an integer of 2 to 10, n represents an integer of 0 to 18; p represents an integer of 2 to 10, and v, w, x and y each represent an integer of 0 to 100.

In order to increase the compatibility between the polypropylene carbonate resin (a1) and the thermoplastic resin (a2) in the base resin (A), the polypropylene carbonate compatibilizer (B) is used in 0.1 to 20 parts by weight based on 100 parts by weigh of the base resin (A). Here, the compatibilizer may be an acryl-based copolymer having a weight average molecular weight of 5,000 to 10,000,000 g/mol, or low-molecular weight polypropylene carbonate or polypropylene carbonate copolymer, which has a weight average molecular weight of 500 to 1,000,000 g/mol. The acryl-based copolymer may be a polymer formed by copolymerization of at least two monomers selected from the group consisting of a linear alkyl(meth)acrylate monomer, a branched alkyl(meth)acrylate monomer, a cyclic alkyl(meth)acrylate monomer, and combinations thereof.

The feeding of the cross-linking agent, the chain extender, or the mixture thereof (C) can increase the melt viscosity of the thermoplastic polymer and polypropylene carbonate (PPC) and attain a stable shape at the time of foaming. Here, if the use content of the cross-linking agent, the chain extender, or the mixture thereof is below 0.01 parts by weight, the usage thereof is meaningless, and if above 10 parts by weight, the melt viscosity of the mixed materials are so high that they are not appropriate to process. At least one polyisocyanate selected from the group consisting of 2,4-tolylene diisocyanate, 2,6-tolylene diisocyanate, 4,4'-diphenylmethane diisocyanate, m-phenylene diisocyanate, xylylene diisocyanate, tetramethylene diisocyanate, hexamethylene diisocyanate, lysine diisocyanate ester, 1,4-cyclohexylene diisocyanate, 4,4'-dicyclohexylmethane diisocyanate, 3,3'-dimethyl-4,4'-biphenylene diisocyanate, p-maleimidophenyl isocyanate, 1,6-hexamethylene diisocyanate, and isophorne diisocyanate, may be used as the cross-linking agent. One or a mixture of two or more diols or a polyol mixture selected from the group consisting of ethylene glycol, 1,4-buthane diol, 1,5-pentane diol, 1,6-hexane diol, 1,10-decane diol, 2,2-dimethyl-1,3-propane diol, 1,3-propane diol, trimethyl propanol, bisphenol, polyester diol, polyether diol, polycaprolactone diol and polycarbonate diol, may be used as the chain extender. Also, the cross-linking agent and the chain extender may be used in combination.

The inorganic material (D) may be used in order to improve the shape stability and the heat resistant property of the foam after foaming. If the content of the inorganic material (D) is below 0.1 parts by weight, the adding thereof is meaningless, and if 10 parts by weight or more, the foaming performance is decreased. Specifically, one or a mixture of two or more selected from the group consisting of titanium dioxide, talc, kaolin, wollastonite, mica and ceramic particles including one or more metals selected from the group consisting of titanium (Ti), lead (Pb), barium (Ba), silicon (Si), tin (Sn), calcium (Ca), magnesium (Mg), aluminum (Al), niobium (Nb), zirconium (Zr), iron (Fe), tungsten (W), vanadium (V), manganese (Mn), cobalt (Co), nickel (Ni), zinc (Zn), and rare metal elements may be used as the inorganic material.

The heat stabilizer (E) is used in order to protect the composition from a heat decomposition phenomenon that may occur at the time of material processing. If the content of the heat stabilizer (E) is below 0.01 parts by weight, the adding thereof is meaningless, and if 1 parts by weight or more, further thermal stability is hardly expected. As the heat stabilizer, one or a mixture of two or more selected from the group consisting of phenol-based, hydroquinone-based, benzyl alcohol-based, quinone-based, and amine-based compounds may be used. Specifically, one or a mixture of two or more selected from the group consisting of phenothiazine, p-methoxyphenol, cresol, benzhydrol, 2-methoxy-p-hydroquinone, 2,5-di-tert-butylquinone and diisopropylamine may be preferably used.

In addition, the expandable polypropylene carbonate may further include, besides the above constituent elements (A) to (E), a flame retardant agent (F), an impact reinforcement agent (G), or a mixture thereof.

The flame retardant agent is used to impart a flame retardant property or improve a heat resistant property, and examples thereof are particularly not limited. Specifically, one or a mixture of two or more selected from the group consisting of phosphor-based flame retardant agents, nitrogen compound-based flame retardant agents, silicon-based flame retardant agents, inorganic-based flame retardant agents, melamine-based flame retardant agents, and halogen-based flame retardant agents may be used.

The phosphor-based flame retardant agent means a common flame retardant agent containing phosphor. Specific examples thereof may include, red phosphite, phosphate, phosphonate, phosphinate, phosphine oxide, phosphazene, and metal salts thereof, but is necessarily not limited thereto. Examples of the nitrogen compound-based flame retardant agent may include aliphatic amine compounds, aromatic amine compounds, nitrogen-containing heterocyclic compounds, cyan compounds, aliphatic amides, aromatic amides, urea, and thiourea. Examples of the silicon-based flame retardant agent may include silicon resin and silicon oil. Examples of the silicon resin include a resin having a three-dimensional net structure where $RSiO_{3/2}$, $RSiO$, or $RSiO_{1/2}$ units can be combined. Here, R represents an alkyl group having 1 to 10 carbon atoms such as methyl, ethyl, propyl, or the like, an aromatic group, or a substituted group in which a vinyl group is contained in each of the above groups. Examples of the silicon oil may include polydimethyl siloxane, modified polysiloxane and a mixture thereof, in which at least one methyl group at a side chain or a terminal of polydimethyl siloxane is modified by at least one selected from the group consisting of hydrogen, alkyl, cyclohexyl, phenyl, benzyl, epoxy, polyether, carboxyl, mercapto, chloroalkyl, alkyl alcohol ester, alcohol, allyl, vinyl, trifluoromethyl, and a combination thereof. Examples of the inorganic based flame retardant agent may include silicon dioxide ($SiO_2$), magnesium hydroxide, aluminum hydroxide, antimony trioxide, antimony pentoxide, antimony, sodium carbonate, zinc hydroxy stannate, zinc stannate, metastannic acid tin oxide, tin oxide salts, zinc sulfate, zinc oxide, ferrous oxide, ferric oxide, stannous oxide, stannic oxide, zinc borate, calcium borate, ammonium borate, ammonium octamolybdate, metal salts of tungstic acid, composite oxides of tungsten and metalloid, zirconium based compounds, guanidine based compounds, graphite, talc, expandable graphite, and the like. Examples of the melamine-based flame retardant agent may include melamine phosphate, dimelamine phosphate, melamine pyrophosphate, melamine cyanurate and the like. Any halogen-based compound that can function as a flame retardant agent may be used as the halogen-based flame retardant agent without limitation. For example, a commercialized flame retardant agent, such as, decabromo diphenyl ether, decabromo diphenyl ethane, tetrabromo bisphenol-A, tetrabromo bisphenol-A epoxy oligomer, octabromo trimethylphenyl indane, ethylene-bis-tetrabromophthalimide, tris(tribromophenoxy)triazine, polystyrene bromide, or the like, may be used.

The flame retardant agent may be further included in the composition in 0.01 to 50 parts by weight based on 100 parts by weight of the base resin. If the content of the flame retardant agent is below 0.01 parts by weight, a flame retardant effect is difficult to obtain, and if above 50 parts by weight, physical properties, such as, impact strength and the like, may be remarkably deteriorated.

The impact reinforcement agent is used to improve impact resistant property, and may be further included in 1 to 20 parts by weight based on 100 parts by weight of the base resin. If the impact reinforcement agent is used below part by weight, an impact reinforcement effect is decreased, and if above 20 parts by weight, scratch resistant property and flame retardant property may be deteriorated. At least one selected from the group consisting of a core-shell structured copolymer and a chain structure reinforcement agent may be used as the impact reinforcement agent. The core-shell structure copolymer preferably has a structure where an unsaturated monomer selected from the group consisting of alkyl(meth)acrylate, (meth)acrylate, acid anhydride, alkyl or phenyl nucleus-substituted maleimide, and combinations thereof is grafted onto a core made of rubber selected from the group consisting of diene-based rubber, acryl-based rubber, silicon-based rubber, and combinations thereof to form a shell.

In addition, the expandable polypropylene carbonate is prepared by foaming the composition for preparing an expandable polypropylene carbonate, which includes the base resin (A) consisting of polypropylene carbonate resin without generation of harmful gases at the time of burning, and the thermoplastic resin; the polypropylene carbonate compatibilizer (B); the cross-linking agent, the chain extender, or the mixture thereof (C); the inorganic material (D); and the heat stabilizer (E), after a supercritical state fluid is at an appropriate temperature and an appropriate pressure.

When an expandable polypropylene carbonate is prepared by using the composition for preparing an expandable polypropylene carbonate according to the present invention, the composition and a supercritical fluid as a foaming agent are fed into a main reactor, and then heated to a temperature close to a melt point of the thermoplastic resin included in the composition, preferably. In other words, since the foaming agent is difficult to uniformly permeate into the composition when the thermoplastic resin is melting, the composition is favorably heated until the composition is completely melted while it has flowability. This heating temperature may be selected depending on the kind of the thermoplastic resin. For example, in a case where polybutylene succinate as the thermoplastic resin is mixed in polypropylene carbonate to prepare a composition, it is favorable to perform heating from room temperature (2517) to a set temperature of 80 to 100° C. and maintain the heated material at the set temperature for 5 to 30 minutes, and it is preferable to remove the supercritical fluid at the temperature of 80 to 100° C. and perform foaming, at the time of preparing the foam.

When an expandable polypropylene carbonate is prepared by using the composition for preparing an expandable polypropylene carbonate according to the present invention, two kinds of foaming agents, that is, a first foaming agent and a second foaming agent may be simultaneously used or only one kind of foaming agent, that is, only the second foaming agent may be used.

Any one foaming agent that can be commonly employed in preparing the existing expandable polyolefin may be used as the first foaming agent. In the present invention, examples of the first foaming agent used in preparing this existing expandable polyolefin may include one or a mixture of two or more selected from isobutene, butane, propane, and pentane.

A supercritical fluid may be used as the second foaming agent. Here, any supercritical fluid that can be used as the foaming agent may be used as the second foaming agent. In the present invention, examples of the supercritical fluid as the second foaming agent usable in preparing the expandable polyolefin may include one or a mixture of two or more selected from supercritical carbon dioxide, supercritical isobutene, supercritical butane, supercritical propane, and supercritical pentane. In the present invention, as for the foaming agent, the content of the second foaming agent may be 1 to 20 times the content of the first foaming agent.

Other features and aspects will be apparent from the following detailed description, the drawings, and the claims.

DETAILED DESCRIPTION OF EMBODIMENTS

Hereinafter, the present invention will be specifically described through preferred embodiments. However, these are for describing the present invention in more detail, and the scope of the present invention is not limited thereto.

Hereinafter, physical properties were measured by the following methods.

<Evaluation on Heat-Resistant Temperature>

An upper limit temperature, at which deformation of a foam does not occur and an initial shape and dimensional stability of the expandable foam are maintained for a predetermined time period, was measured.

<Evaluation on Flammability>

Flammability of a foam was measured according to the flammability evaluation method of KSM 3808, by testing whether the ignited fire was extinguished within 3 seconds.

Comparative Example 1

A foam was formed by feeding polypropylene carbonate (molecular weight: 150,000) pellets and followed by carbon dioxide into a main reactor, increasing the temperature from room temperature to 80° C., maintaining a state of supercritical carbon dioxide for 1 hour so that the supercritical carbon dioxide was permeated into the pellets, and then exhausting the carbon dioxide gas through an exhaust port. The foaming results were tabulated in table 1.

Example 1

100 parts by weight of a base resin consisting of 70 wt % of polypropylene carbonate (molecular weight: 150,000) and 30 wt % of polybutylene succinate (PBS, molecular weight:

170,000), 1 part by weight of a polypropylene carbonate compatibilizer (a polypropylene carbonate copolymer, molecular weight: 150,000, SK Energy Company), 0.5 parts by weight of p-maleimidophenylisocyanate (PMPI), 5 parts by weight of $CaCO_3$ and 0.02 parts by weight of heat stabilizer (Songnox 1076, SongWon Company) were mixed and extruded through a twin screw extruder, thereby molding pellets. A foam was formed by feeding the prepared pellets and followed by carbon dioxide into a main reactor, increasing the temperature from the room temperature to 80° C., maintaining a state of supercritical carbon dioxide for 1 hour so that the supercritical carbon dioxide was permeated into the pellets, and then exhausting the carbon dioxide gas through an exhaust port. The foaming results were tabulated in table 1.

Example 2

100 parts by weight of a base resin consisting of 50 wt % of polypropylene carbonate (molecular weight: 150,000) and 50 wt % of PBS (molecular weight 170,000), 1 part by weight of a polypropylene carbonate compatibilizer (a polypropylene carbonate copolymer, molecular weight: 150,000, SK Energy Company), 0.5 parts by weight of PMPI, 5 parts by weight of $CaCO_3$ and 0.02 parts by weight of heat stabilizer (Songnox 1076, SongWon Company) were mixed and extruded through a twin screw extruder, thereby molding pellets. A foam was formed by feeding the prepared pellets and followed by carbon dioxide into a main reactor, increasing the temperature from the room temperature to 80° C., maintaining a state of supercritical carbon dioxide for 1 hour so that the supercritical carbon dioxide was permeated into the pellets, and then exhausting the carbon dioxide gas through an exhaust port. The foaming results were tabulated in Table 1.

Example 3

100 parts by weight of a base resin consisting of 30 wt % of polypropylene carbonate (molecular weight: 150,000) and 70 wt % of PBS (molecular weight 170,000), 1 part by weight of a polypropylene carbonate compatibilizer (a polypropylene carbonate copolymer, molecular weight: 150,000, SK Energy Company), 0.5 parts by weight of PMPI, 5 parts by weight of $CaCO_3$ and 0.02 parts by weight of heat stabilizer (Songnox 1076, SongWon Company) were mixed and extruded through a twin screw extruder, thereby molding pellets. A foam was formed by feeding the prepared pellets and followed by carbon dioxide into a main reactor, increasing the temperature from the room temperature to 8017, maintaining a state of supercritical carbon dioxide for 1 hour so that the supercritical carbon dioxide was permeated into the pellets, and then exhausting the carbon dioxide gas through an exhaust port. The foaming results were tabulated in table 1.

Example 4

100 parts by weight of a base resin consisting of 50 wt % of polypropylene carbonate (molecular weight: 150,000) and 50 wt % of PBS (molecular weight 170,000), 1 part by weight of a polypropylene carbonate compatibilizer (a polypropylene carbonate copolymer, molecular weight: 150,000, SK Energy Company), 0.5 parts by weight of PMPI, 5 parts by weight of $CaCO_3$, 0.02 parts by weight of heat stabilizer (Songnox 1076, SongWon Company), and 30 parts by weight of $Al(OH)_3$ were mixed and extruded through a twin screw extruder, thereby molding pellets. A foam was formed by feeding the prepared pellets and followed by carbon dioxide into a main reactor, increasing the temperature from the room temperature to 80° C., maintaining a state of supercritical carbon dioxide for 1 hour so that the supercritical carbon dioxide was permeated into the pellets, and then exhausting the carbon dioxide gas through an exhaust port. The foaming results were tabulated in table 1.

TABLE 1

| | | Unit | Comparative example 1 | Example 1 | Example 2 | Example 3 | Example 4 |
|---|---|---|---|---|---|---|---|
| (A) Base resins | PPC Content | Wt % | 100 | 70 | 50 | 30 | 50 |
| | PBS content | wt % | 0 | 30 | 50 | 70 | 50 |
| (B) PPC compatibilizer | | Parts by weight | 0 | 1 | 1 | 1 | 1 |
| (C) Crossing-linking agent/Chain extender | | Parts by weight | 0 | 0.5 | 0.5 | 0.5 | 0.5 |
| (D) Inorganic material | | Parts by weight | 0 | 5 | 5 | 5 | 5 |
| (E) Heat stabilizer | | Parts by weight | 0 | 0.02 | 0.02 | 0.02 | 0.02 |
| (F) Flame-retardant agent | | Parts by weight | 0 | 0 | 0 | 0 | 30 |
| (G) Impact reinforcement agent | | Parts by weight | 0 | 0 | 0 | 0 | 0 |
| Foaming Temperature | | ° C. | 90 | 90 | 90 | 90 | 90 |
| $CO_2$ Pressure | | bar | 140 | 140 | 140 | 140 | 140 |
| Foaming ratio | | Multiples | 40 | 40 | 40 | 40 | 40 |
| Heat resistant temperature | | ° C. | 25 | 80 | 90 | 90 | 90 |
| Heat resistant temperature retention time | | Hours | 0.5 | 24 | 24 | 24 | 24 |
| KSM 3808 Flameproofing property | | Within seconds | 3 | 3 | 3 | 3 | 1 |

As shown in Table 1, the foam formed in Comparative example 1 had a foam rate of 40 times, and the formed foam shrank at room temperature within 0.5 hours, thereby shape retention was impossible. The foam formed in each of Examples 1 to 4 had a foam rate of 40 times, and the formed foam showed excellent shape stability and dimensional stability even though it was maintained in an oven at 90° C. for 24 hours.

As set forth above, high magnification of expandable polypropylene carbonate capable of remarkably reducing harmful gases generated at the time of burning and having excellent thermal stability and dimensional stability can be prepared by using the composition for preparing an expandable polypropylene carbonate according to the present invention.

What is claimed is:

1. A composition for preparing an expandable polypropylene carbonate, comprising:
    (A) 100 parts by weight of a base resin consisting of (a1) 10 to 90 wt % of a polypropylene carbonate resin and (a2) 10 to 90 wt % of a thermoplastic resin;
    (B) 0.1 to 20 parts by weight of a compatibilizer, wherein the compatibilizer is a polypropylene carbonate copolymer having a weight average molecular weight of 500 to 1,000,000 g/mol;
    (C) 0.01 to 10 parts by weight of a cross-linking agent, a chain extender, or a mixture thereof;
    (D) 0.1 to 10 parts by weight of an inorganic material; and
    (E) 0.01 to 1 parts by weight of a heat stabilizer.

2. The composition for preparing an expandable polypropylene carbonate of claim 1, further comprising one or a mixture of two or more selected from (F) 0.01 to 50 parts by weight of a flame retardant agent and (G) 1 to 20 parts by weight of an impact reinforcement agent.

3. The composition for preparing an expandable polypropylene carbonate of claim 1, wherein the polypropylene carbonate resin (a1) has a weight average molecular weight of 10,000 to 1,000,000 g/mol.

4. The composition for preparing an expandable polypropylene carbonate of claim 1, wherein the thermoplastic resin (a2) is one or a mixture of two or more selected from the group consisting of polyethylene terephthalate glycol (PETG), polylactic acid, polyvinylacetate, polycaprolactone, polymethylmethacrylate, ethylene-vinylacetate copolymer(EVA), ethylenemethacrylate glycidylmethacylate copolymer, polyethylene, polypropylene, and copolyester of the structure below:

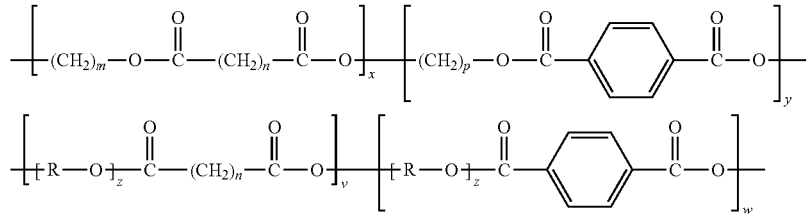

wherein, —[R—O]$_z$— represents polyol selected from the group consisting of (a) polyester polyol triol having a molecular weight of 200 to 10,000, (b) polyether glycol having a molecular weight of 200 to 10,000, and (c) polyester polyol diol having a molecular weight of 10,000 or less; m represents an integer of 2 to 10, n represents an integer of 0 to 18; p represents an integer of 2 to 10, and v, w, x and y each represent an integer of 0 to 100.

5. The composition for preparing an expandable polypropylene carbonate of claim 1, wherein the cross-linking agent (C) is one or a mixture of two or more polyisocyanates selected from 2,4-tolylene diisocyanate, 2,6-tolylene diisocyanate, 4,4'-diphenylmethane diisocyanate, m-phenylene diisocyanate, xylene diisocyanate, tetramethylene diisocyanate, hexamethylene diisocyanate, lysine diisocyanateester, 1,4-cyclohexylene diisocyanate, 4,4'-dicyclohexylmethane diisocyanate, 3,3'-dimethyl-4,4'-biphenylene diisocyanate, p-maleimidophenyl isocyanate, 1,6-hexamethylene diisocyanate and isophorone diisocyanate.

6. The composition for preparing an expandable polypropylene carbonate of claim 1, wherein the chain extender (C) is one or a mixture of two or more selected from the group consisting of ethylene glycol, 1,4-butanediol, 1,5-pentanediol, 1,6-hexanediol, 1,10-decanediol, 2,2-dimethyl-1,3-propanediol, 1,3-propanediol, trimethylpropanol, bisphenol, polyester diol, polyether diol, polycaprolactonediol and polycarbonatediol.

7. The composition for preparing an expandable polypropylene carbonate of claim 1, wherein the inorganic material (D) is one or a mixture of two or more selected from the group consisting of titanium dioxide, talc, kaolin, wollastonite, mica and ceramic particles including one or more metals selected from the group consisting of titanium (Ti), lead (Pb), barium (Ba), silicon (Si), tin (Sn), calcium (Ca), magnesium (Mg), aluminum (Al), niobium (Nb), zirconium (Zr), iron (Fe), tungsten (W), vanadium (V), manganese (Mn), cobalt (Co), nickel (Ni), zinc (Zn), and rare metal elements.

8. The composition for preparing an expandable polypropylene carbonate of claim 1, wherein the heat stabilizer (E) is one or a mixture of two or more selected from the group consisting of phenol-based, hydroquinone-based, benzyl alcohol-based, quinone-based, and amine-based compounds.

9. The composition for preparing an expandable polypropylene carbonate of claim 8, wherein the heat stabilizer (E) is one or a mixture of two or more selected from the group consisting of phenothiazine, p-methoxyphenol, cresol, benzhydrol, 2-methoxy-p-hydroquinone, 2,5-di-tert-butylquinone, and diisopropylamine.

10. The composition for preparing an expandable polypropylene carbonate of claim 2, wherein the flame retardant agent (F) is one or a mixture of two or more selected from the group consisting of phosphor-based flame retardant agents, nitrogen compound-based flame retardant agents, silicon-based flame retardant agents, inorganic-based flame retardant agents, melamine-based flame retardant agents, and halogen-based flame retardant agents.

11. The composition for preparing an expandable polypropylene carbonate of claim 2, wherein the impact reinforcement agent (G) is one or a mixture of two or more selected from the group consisting of a core-shell structure copolymer and a chain structure reinforcement agent.

12. The composition for preparing an expandable polypropylene carbonate of claim 11, wherein the core-shell structure copolymer has a structure where an unsaturated monomer selected from the group consisting of alkyl(meth)acrylate, (meth)acrylate, acid anhydride, alkyl or phenyl nucleus-substituted maleimide, and combinations thereof is grafted onto a core made of rubber selected from the group consisting of diene-based rubber, acryl-based rubber, silicon-based rubber, and combinations thereof to form a shell.

13. An expandable polypropylene carbonate prepared by the composition for preparing an expandable polypropylene carbonate of claim 1.

* * * * *